Dec. 1, 1931.  L. D. SOUBIER  1,834,478
APPARATUS FOR WORKING MOLTEN GLASS
Filed May 25, 1928  3 Sheets-Sheet 1
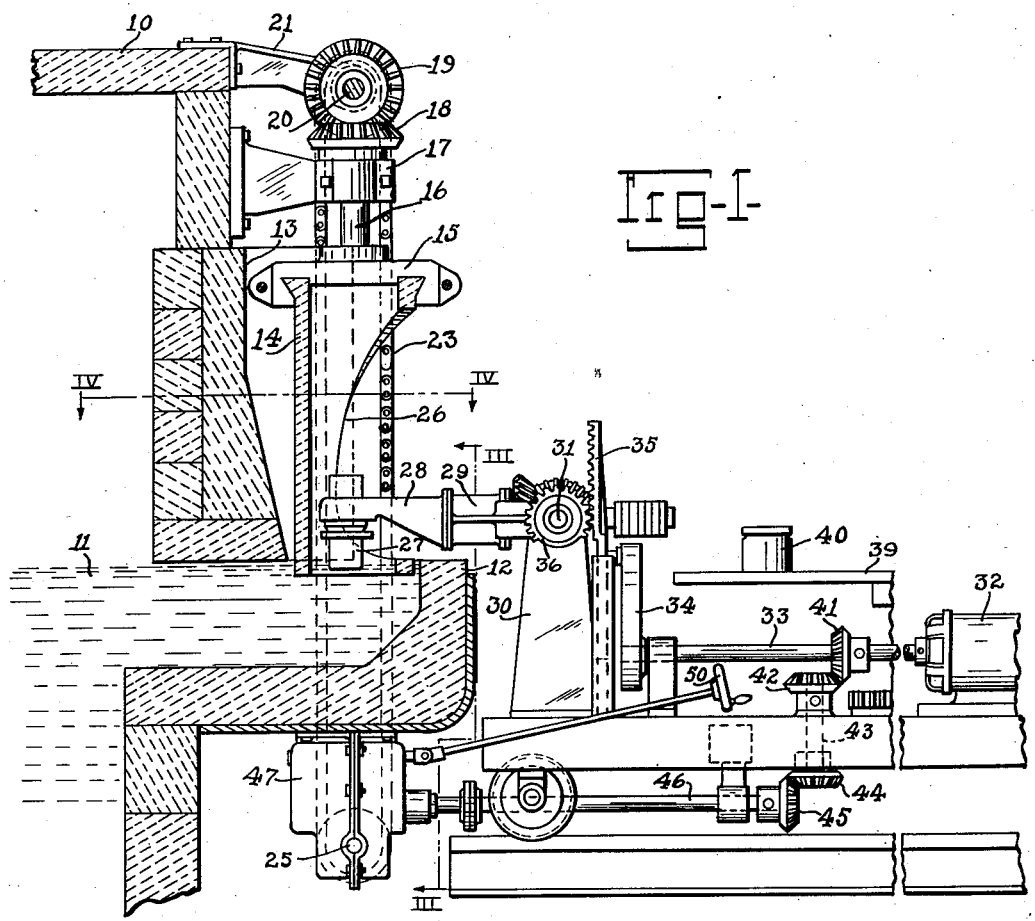
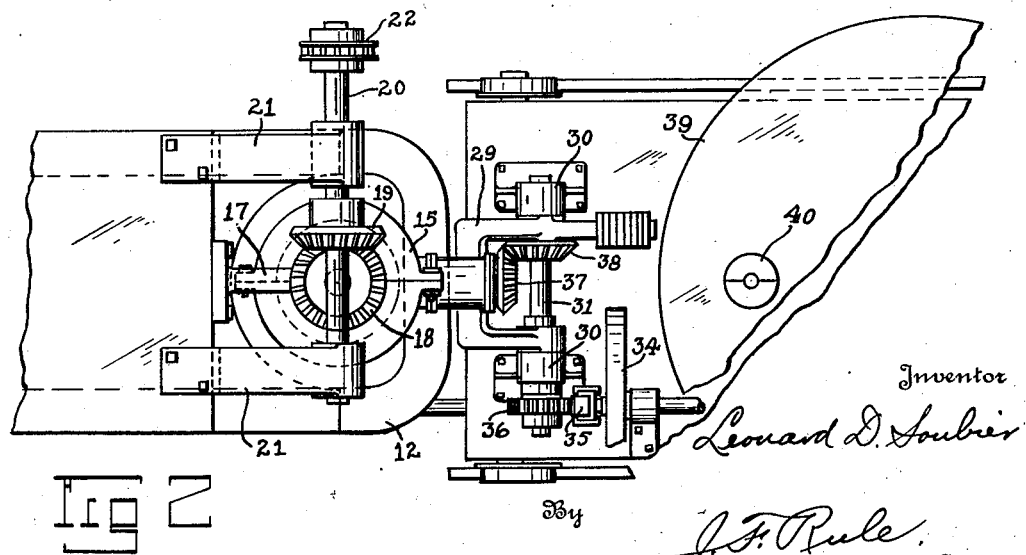
Inventor
Leonard D. Soubier
By
J. F. Rule.
Attorney

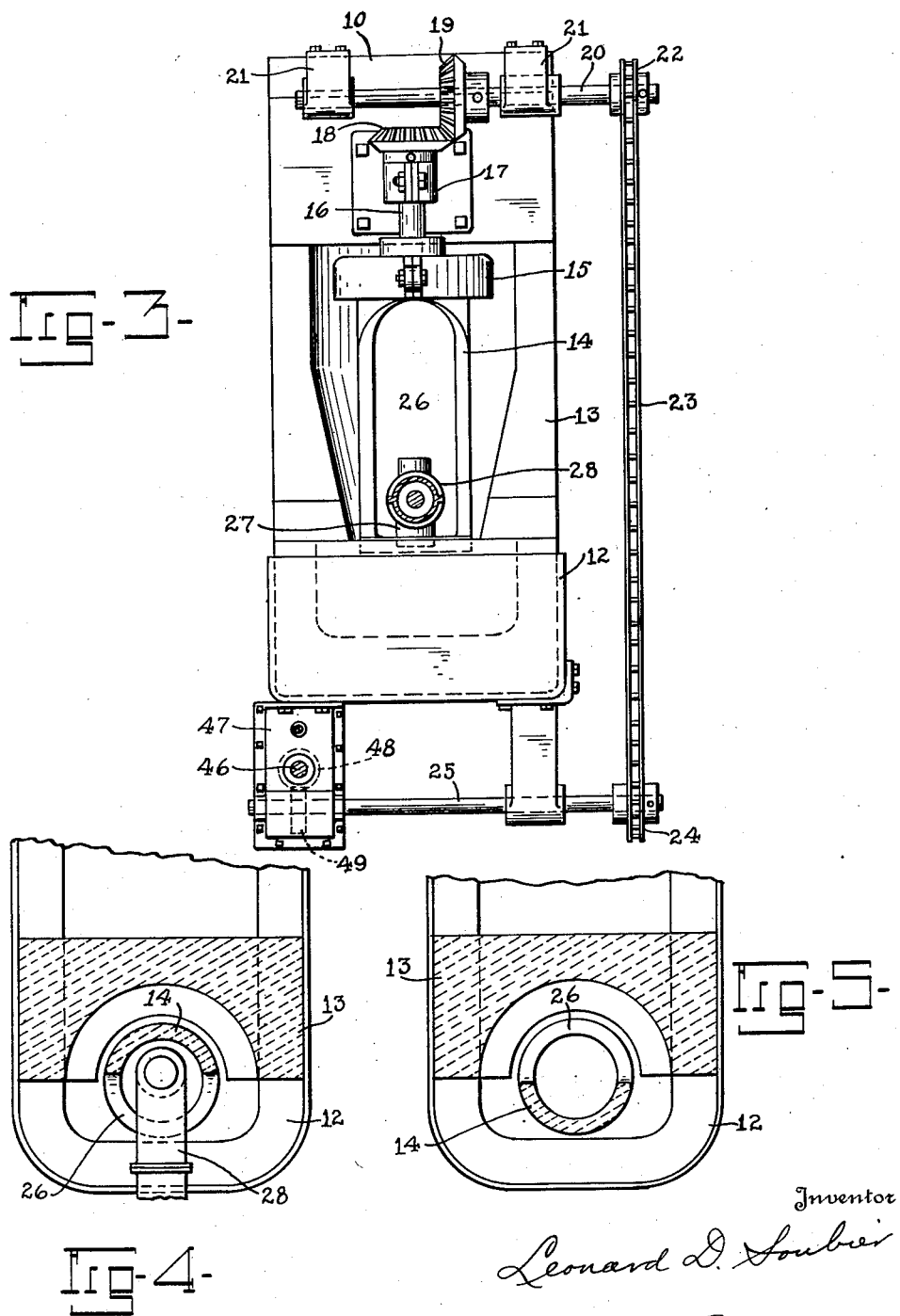

Dec. 1, 1931.  L. D. SOUBIER  1,834,478
APPARATUS FOR WORKING MOLTEN GLASS
Filed May 25, 1928  3 Sheets-Sheet 3
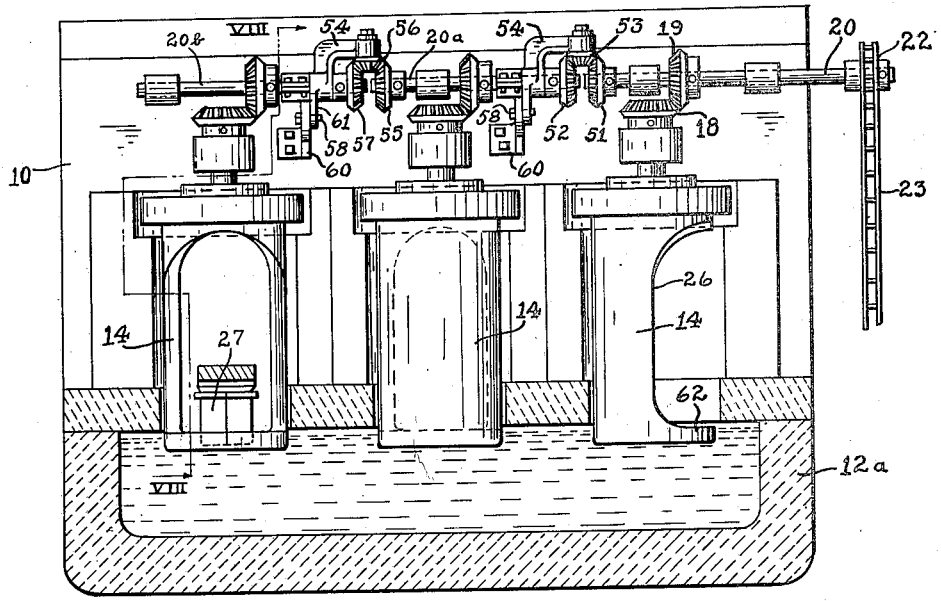
Fig-6-
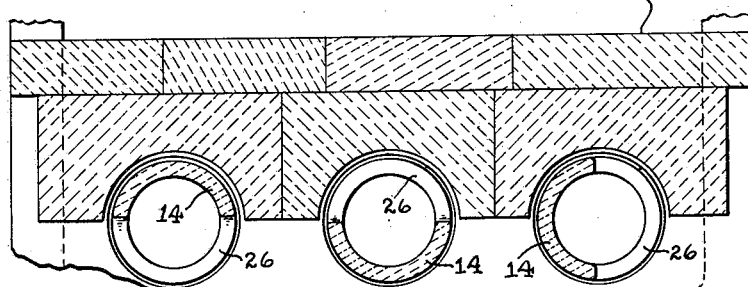
Fig-7-
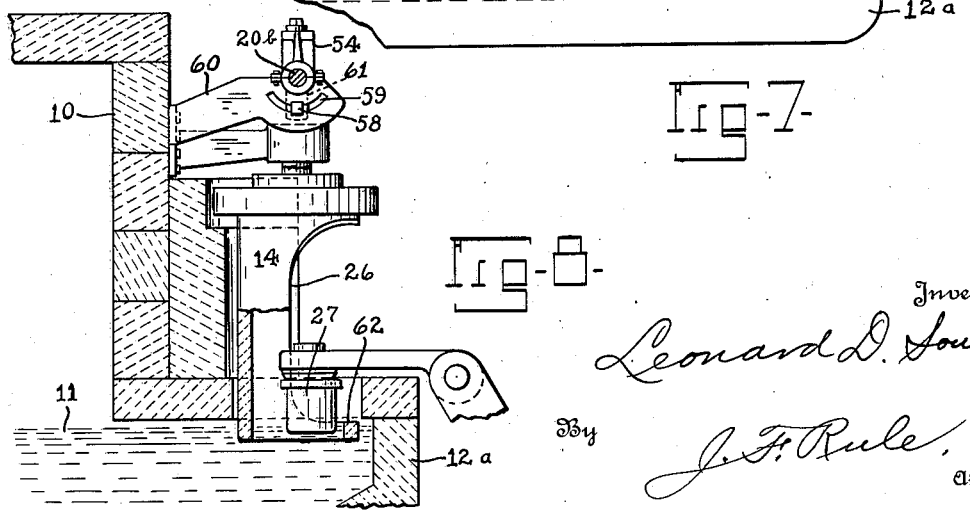
Fig-8-
Inventor
Leonard D. Soubier
By J. F. Rule,
Attorney Patented Dec. 1, 1931

1,834,478

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

APPARATUS FOR WORKING MOLTEN GLASS

Application filed May 25, 1928. Serial No. 280,416.

My invention relates to apparatus for use in gathering mold charges of molten glass. An object of the invention is to provide improved means for supplying glass to a gathering area from which mold charges of glass may be drawn by suction into the gathering molds.

In its preferred form, the invention includes a main tank from which the glass is continuously supplied to a forehearth or extension providing an exposed gathering area. A tubular stirring implement arranged above said area may extend downward into contact with the glass and is continuously rotated, said implement having a portion cut away at one side to provide an opening through which a gathering mold is periodically projected for gathering the glass.

Other features of the invention will appear hereinafter.

In the accompanying drawings:

Fig. 1 is a part sectional elevation showing apparatus embodying the principles of my invention.
Fig. 2 is a plan view of the same.

Fig. 3 is a part sectional front elevation, the section being at the line III—III on Fig. 1.

Fig. 4 is a sectional plan view, the section being taken at the line IV—IV on Fig. 1.

Fig. 5 is a similar view with parts in a different position, the gathering mold having been withdrawn and the tubular member rotated through half of a complete rotation.
Figs. 6 to 8 illustrate a modification in which a plurality of gathering areas are provided and periodically presented in a predetermined order to the gathering molds.

Fig. 6 is a sectional front elevation.
Fig. 7 is a sectional plan view; and

Fig. 8 is a sectional side elevation at the line VIII—VIII on Fig. 6.

Referring particularly to Figs. 1 to 5 of the drawings, a furnace 10 which may be of usual construction, provides a continuous supply of molten glass 11 to a gathering area in the furnace boot or extension 12. A jack arch 13 separates the gathering area from the glass within the main furnace tank. A tubular member 14 made of fire clay or other refractory material is vertically arranged in front of the jack arch and its lower end projects into the glass in the forehearth 12 and defines the gathering area.

The tube 14 is adapted to be rotated continuously about its vertical axis, thereby serving as a glass stirring implement and also serving other purposes, as will appear hereinafter. The tube is mounted in a head or clamp 15 to which is connected a vertical shaft 16 extending upward through a bearing bracket 17. A bevel gear 18 is keyed to the upper end of the shaft 16, said gear having a bearing on the bracket 17. Running in mesh with the gear 18 is a bevel gear 19 keyed to a horizontal shaft 20 having bearings in brackets 21. The brackets 17 and 21 may be mounted on the furnace walls as indicated. Keyed to the shaft 20 is a sprocket 22 on which runs a sprocket chain 23 extending downward and over a sprocket wheel 24 keyed to a horizontal drive shaft 25 beneath the forehearth 12. The shaft 25 is driven continuously, as hereinafter set forth, and operates through the gearing just described to impart a continuous rotation to the tube 14.

The tube 14 has a portion of its vertical walls cut away as indicated at 26 in order to provide an opening through which a mold or gathering head may be introduced and brought into contact with the glass for gathering a charge of glass. The gathering head or mold may form a part of a glass forming machine and is periodically moved through the opening 26 into gathering position, being operated in synchronism with the rotation of the tube 14 and timed to be brought into gathering position while said opening is in a forward position, as shown in Fig. 1. The rotation of the tube 14 serves to maintain a continuous movement or circulation of the glass so that the glass at the gathering area is maintained in proper condition. The rotation of the tube also serves to shut off the gathering area from exposure to the atmosphere except for the time required for gathering the charge, thus preventing excessive cooling of the glass.

For the purpose of illustration, I have herein shown (Figs. 1 and 2) a glass gathering and forming machine cooperating with the tube 14, but it will be understood that the apparatus may be used with any type of machine generally, which projects a gathering head or mold into a pool of glass for gathering a charge by suction or otherwise. As the particular construction of the machine herein shown does not in itself form a part of the present invention, except insofar as it is adapted to cooperate with the furnace and the rotating tube 14, the machine is not disclosed in all its details. Such machine is fully set forth in my co-pending application Serial Number 233,050, filed November 14, 1927.

This machine includes a suction gathering mold 27 carried on a head 28, said head being mounted for rotation about its longitudinal axis in a yoke 29 mounted in standards 30. The yoke is adapted to oscillate about the axis of a stationary shaft 31. The mechanism for oscillating the yoke includes a motor 32 having a driving connection with a shaft 33 to which is secured a cam 34. The cam as it rotates, imparts a vertical reciprocating movement to a rack 35 which runs in mesh with a gear 36 connected to the yoke 29. The gathering head 28 has connected thereto a bevel pinion 37 which runs in mesh with a stationary pinion 38 on the shaft 31. A mold carriage 39 has mounted thereon finishing molds 40 which are brought in position by the rotation of the mold carriage, to receive the parisons of glass from the gathering mold 27. The mold carriage is rotated by suitable mechanism (not shown) operating in synchronism with the movements of the gathering head.

As the rack 35 moves downward, it rotates the yoke 29 to swing the gathering head 28 and mold 27 from the gathering position (Fig. 1) vertically through an arc of substantially 180 degrees for transferring the parison to the finishing mold. During this transfer movement, the pinion 37 running in mesh with the stationary gear 38, rotates the gathering head 28 about its own axis through a half revolution to properly present the parison to the finishing mold.

Power is transmitted to the drive shaft 25 from the motor 32 through a train of gears including a gear 41 on the shaft 33, said gear meshing with a pinion 42 keyed to a vertical shaft 43 to which is also keyed a gear 44 running in mesh with a gear 45 fixed to a horizontal shaft 46. A timer device 47 is provided by which the rotative position of the tube 14 may be adjusted so that the gathering opening therein will be presented in proper timed relation to the movements of the mold 27 to charge gathering position. This timing mechanism includes a spiral gear 48 (see Fig. 3) fixed to the shaft 46 and running in mesh with a spiral gear 49 fixed to the shaft 25. The gear 48 is carried in a bearing yoke (not shown) which with said gear is adjustable lengthwise of the shaft 46 by means of an adjusting screw operated by a hand wheel 50 (Fig. 1) connected thereto. This movement of the gear 48 rotates the gear 49, thereby rotating the tube 14. The construction and operation of the timing mechanism is fully set forth in the U. S. patent to La France, Number 1,685,166, September 25, 1928. The particular construction of this timing mechanism is not a part of the present invention, and it will be understood that any approved mechanism may be employed for the purpose of adjusting the drive shaft 25 relative to the shaft 46 for bringing the tube 14 into synchronism with the gathering mechanism.

By reference to Figs. 4 and 5, it will be seen that during the gathering operation, the opening 26 in the tube 14 exposes the gathering area (Fig. 4) permitting the mold to be projected into the glass, and after the mold is withdrawn the rotation of the tube carries the opening 26 inward (Fig. 5) so that it faces the jack arch, and the wall of the tube is moved into such position that the glass at the gathering area is enclosed or substantially shut off from exposure to atmospheric air.

Referring to the modified construction shown in Figs. 6 to 8, inclusive, the forehearth $12^a$ is elongated to accommodate a plurality of rotating tubes 14 arranged side by side and suitably spaced to permit concurrent operation of a plurality of gathering devices operating to gather respectively from the several gathering areas defined by said tubes. Separate machines may be provided corresponding to the several tubes and each having a gathering head cooperating with one of the tubes. It will also be understood that a plurality of gathering heads or devices may be provided for forming and delivering charges of glass to a single machine, the several gathering heads cooperating respectively with the several tubes.

The tubes 14, as shown in Fig. 6, are all rotated by power transmitted through the chain 23 to the shaft 20. Said shaft may comprise one section of a line shaft which also includes sections $20^a$ and $20^b$ from which the middle and left hand tubes 14, respectively, are driven. Power is transmitted from the section 20 to the section $20^a$ through gears 51 and 52 keyed to said sections respectively and an intermediate pinion 53 running in mesh with said gears. The pinion 53 is carried on a bracket 54 which also provides a bearing for the shaft section $20^a$. The shaft section $20^b$ is in like manner driven by power transmitted from the shaft $20^a$ through gears 55, 56 and 57. It will be noted that with the train of gearing shown, the direction of rotation of each tube 14 is opposite from that of the next adjacent tube on either side. This arrangement by which adjacent tubes rotate in opposite directions, provides an effective means for stirring the glass and keeping the glass at the gathering area in a homogeneous condition. It will be understood that if desired, all of the tubes may be rotated in the same direction, or any selected number may be rotated in one direction and the remainder in the reverse direction. Also, the number of tubes employed may be increased or decreased as conditions may require.

By reference to Fig. 6, it will be noted that the middle tube is in a position of rotation 180 degrees in advance of the left hand tube, and that the right hand tube is at an intermediate position of advancement. The relative rotative positions of the tubes may, of course, be varied as desired. In some instances, it may be desirable to have the tubes all in the same rotative position so that charges of glass may be gathered from all of the gathering areas simultaneously.

In order to permit each tube 14 to be readily adjusted rotatively relative to the other tubes, each of the brackets 54 is journalled on the line shaft for rotative adjustment about the axis of said shaft. Each bracket is secured in its adjusted position by means of a clamping bolt 58 which extends through a slot 59 in a bearing bracket 60 and is threaded into an arm 61 forming an extension of the bracket 54. It will be seen that by loosening, for example, the bolt 58 associated with the bracket 54 between the middle and left hand tubes 14, and rotating the bracket on its bearings, the pinion 56 will run on the stationary pinion 55 and cause a rotation of the pinion 57, thereby causing rotation of the left hand tube 14 relative to the middle tube. When thus adjusted to any desired relative positions, the clamping screw 58 is set up to lock the bracket 54 so that the tubes will retain their relative position of rotative adjustment. The right hand tube 14 may in like manner be adjusted relatively to the other tubes.

It will be noted that the opening 26 in each tube extends downward to a point near the bottom of the tube and provides a ledge 62 at or near the level of the glass. The usual knife which shears across the bottom of the mold for severing the tail of glass extending from the mold as the latter is lifted from the pool, may operate to sever the glass after the mold has passed beyond the ledge 62, thereby dropping the tail of glass outside of the gathering area. This materially assists in preventing undue chilling of the glass at the gathering area.

Modifications may be resorted to within the spirit and scope of my invention.

What I claim is:

1. The combination with a container for molten glass, of means providing a gathering chamber positioned in its entirety over a gathering area of the glass in the container, and means for rotating said chamber comprising an upright wall about a vertical axis extending therethrough, said chamber having a side opening therein periodically brought into position to permit the introduction of a gathering implement.

2. The combination with a container for molten glass, of a vertically disposed tube positioned in its entirety over a gathering area of glass in the container, said tube having a lateral opening above the glass providing access to the entire gathering area and permitting the introduction of a gathering implement, and means for causing a movement of said tube by which said opening is periodically moved into and out of a position to receive said implement and by which the wall of the tube is periodically moved into said position to protect the glass from exposure to the outside air.

3. The combination with a container for molten glass, of a tube positioned over a gathering area of glass in the container, said tube having a lateral opening above the rim of the container providing access to the gathering area and permitting the introduction of a gathering implement, and means for continuously rotating said tube about a vertical axis extending centrally through the tube and gathering area.

4. The combination of a tank furnace providing a continuous supply of molten glass, said furnace having a forehearth extension presenting a gathering area of glass exterior to the main wall of the furnace, a tube arranged in its entirety over the gathering area and extending upwardly exterior to said main wall and having a lateral opening above the level of the glass, and means for rotating the tube and thereby periodically bringing said opening alternately into position to face said main wall and into an outwardly facing position to permit the introduction of a glass gathering implement to the gathering area.

5. The combination of a tank furnace providing a continuous supply of molten glass, said furnace having a forehearth extension presenting a gathering area of glass exterior to the main wall of the furnace, a tube arranged over the gathering area and having a lateral opening above the level of the glass, a jack arch between the tube and the main furnace tank, said lateral opening extending above the lower end of the jack arch, and means for continuously rotating the tube about an axis extending centrally through the tube and gathering area.

6. The combination of a tank furnace providing a continuous supply of molten glass, said furnace having a forehearth extension presenting a gathering area of glass exterior to the main wall of the furnace, a tube arranged in its entirety over the gathering area and exterior to said main wall and having a lateral opening above the level of the glass, and means for rotating the tube about an axis extending centrally through the tube and gathering area and thereby periodically bringing said opening alternately into position to permit the introduction of a glass gathering implement to the gathering area and into position to face said main wall, said tube projecting downward into the glass and providing means for stirring the glass.

7. The combination of a container for molten glass, a hollow stirring implement projecting into the glass and defining a free and unobstructed circular gathering area, means for moving said stirring implement in the glass about a vertical axis extending centrally through said area, a glass gathering device, and means to project said gathering device into said stirring implement and gather a charge of glass at said area.

8. The combination with a container for molten glass, of a hollow member arranged over the glass in the container and providing a gathering chamber, said member comprising an upright wall having a side opening therein, a suction gathering device, automatic means for periodically projecting said gathering device through said opening into the chamber and gathering a charge of glass, and means for rotating said hollow member about an axis extending therethrough in synchronism with the movements of the gathering device and thereby periodically alternately presenting said opening in position to receive the gathering device and presenting said wall in position to protect said gathering area from exposure to the outside air.

9. The combination with a container for molten glass, of a hollow member arranged over the glass in the container and providing a gathering chamber, said member having an upright wall formed with a side opening therethrough providing access to the interior of said chamber, a suction gathering device, automatic means for periodically projecting said gathering device through said opening into the chamber and gathering a charge of glass, and means for rotating said hollow member about an axis extending therethrough in synchronism with the movements of the gathering device and thereby periodically presenting said opening in position to receive the gathering device, said hollow member having its lower end extended into the glass and providing a means for stirring the glass.

10. The combination with a container for molten glass, of a hollow member arranged over the glass in the container and providing a gathering chamber, said member having an upright wall formed with a side opening providing access to the interior of said chamber, a suction gathering device, automatic means for periodically projecting said gathering device through said opening into the chamber and gathering a charge of glass, means for rotating said hollow member about an axis extending therethrough in synchronism with the movements of the gathering device and thereby periodically presenting said opening in position to receive the gathering device, and timing mechanism operable to rotatively adjust said hollow member, whereby the presentation of said opening to the gathering device may be timed to the movements of the gathering device.

11. The combination of a furnace tank for molten glass comprising a forehearth extension presenting an area of glass exterior to the main wall of the tank, a plurality of upright tubular members arranged side by side over said surface and entirely outside said main wall, each of said members comprising an upright wall provided with a lateral opening for the introduction of a glass gathering implement, and means for rotating said members in synchronism each about its own vertical axis.

12. The combination of a furnace tank for molten glass comprising a forehearth extension presenting an area of glass exterior to the main wall of the tank, a plurality of upright tubular members arranged side by side over said surface and entirely outside said main wall, each of said members comprising an upright wall provided with a lateral opening for the introduction of a glass gathering implement, and means for continuously rotating each of said members about its own vertical axis, said rotating means including gearing interconnecting said members for rotation in synchronism.

13. The combination of a furnace tank for molten glass comprising a forehearth extension presenting an area of glass exterior to the main wall of the tank, a plurality of upright tubular members arranged side by side over said surface and entirely outside said main wall, each of said members comprising an upright wall provided with a lateral opening for the introduction of a glass gathering implement, and means for continuously rotating each of said members about its own vertical axis, said rotating means including gearing interconnecting said members for rotation in synchronism, said gearing being arranged to rotate each two adjacent members in opposite directions.

14. The combination of a container for molten glass, a plurality of upright tubes arranged side by side over the glass, each tube having a lateral opening in an upright wall thereof for the introduction of a gathering implement, gearing for rotating all of said tubes about vertical axes at the same angular velocity, and adjusting means whereby the rotative position of one tube may be adjusted relative to that of another tube.

15. The combination of a furnace tank for molten glass comprising a forehearth extension presenting an area of glass exterior to the main wall of the tank, a tubular member arranged entirely over said area, said member having an upright wall provided with a lateral opening for the introduction of a glass gathering implement, said member rotatable about a vertical axis extending centrally therethrough, supporting means for the member separably connected to the upper end thereof, and mechanical means for imparting rotary movement to the supporting means and thence to said member.

16. The combination of a tank furnace providing a continuous supply of molten glass, said furnace comprising an upright wall above the glass level and a forehearth extending outward beyond said wall and presenting a gathering area of glass exterior to said wall, an upright tube positioned at said gathering area and extending upwardly therefrom in front of said wall, said tube being formed with a lateral opening above the forehearth permitting the introduction of a glass gathering implement to the gathering area within said tube, and means for imparting rotative movement to the tube about its vertical axis and thereby periodically moving said opening into position to face said wall and to position an imperforate wall of the tube in front of the gathering area and thereby protect said area from exposure to the outside air.

17. The combination of a furnace to contain molten glass, said furnace comprising a jack arch and a forehearth extending outwardly beyond the jack arch and presenting a gathering area exterior to the main furnace, a vertical tube in front of said jack arch and having its lower end open and immersed in the glass and defining a circular gathering area, said tube being formed with a side opening, and means for periodically presenting said opening in position for the introduction of a gathering implement to said area.

18. The combination of a furnace to contain molten glass, said furnace comprising a jack arch and a forehearth extending outwardly beyond the jack arch and presenting a gathering area exterior to the main furnace, a vertical tube in front of said jack arch and having its lower end open and immersed in the glass and defining a circular gathering area, said tube being formed with a side opening, and means for continuously rotating said tube about its vertical axis.

Signed at Toledo, in the county of Lucas and State of Ohio, this 23rd day of May, 1928.

LEONARD D. SOUBIER.